Figure 1:
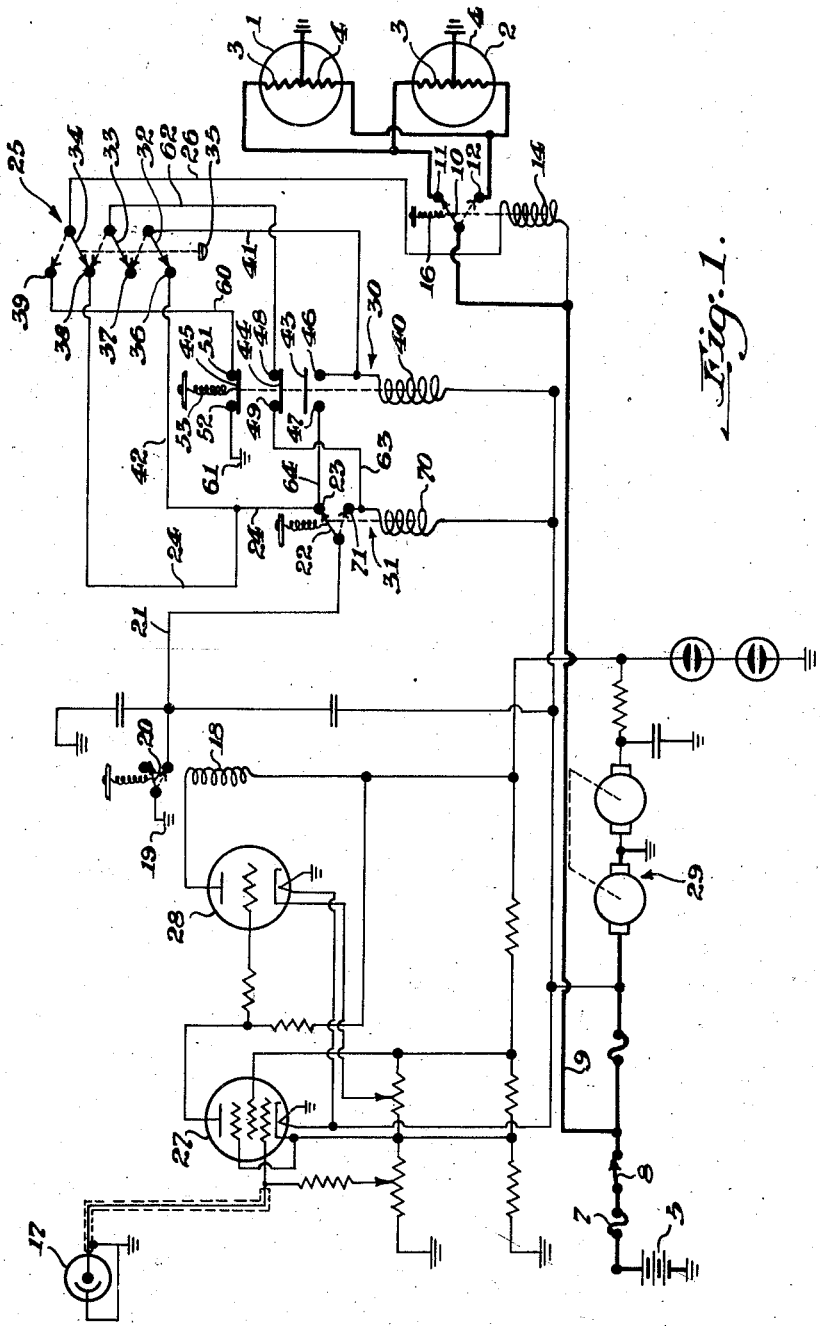

Nov. 25, 1947.    A. B. FRIEDMAN    2,431,394
AUTOMOBILE HEADLIGHT CONTROL
Filed Jan. 29, 1947    2 Sheets—Sheet 1

Inventor
ALFRED B. FRIEDMAN
By Brown, Critchlow, Flick & Peckham
his Attorneys.

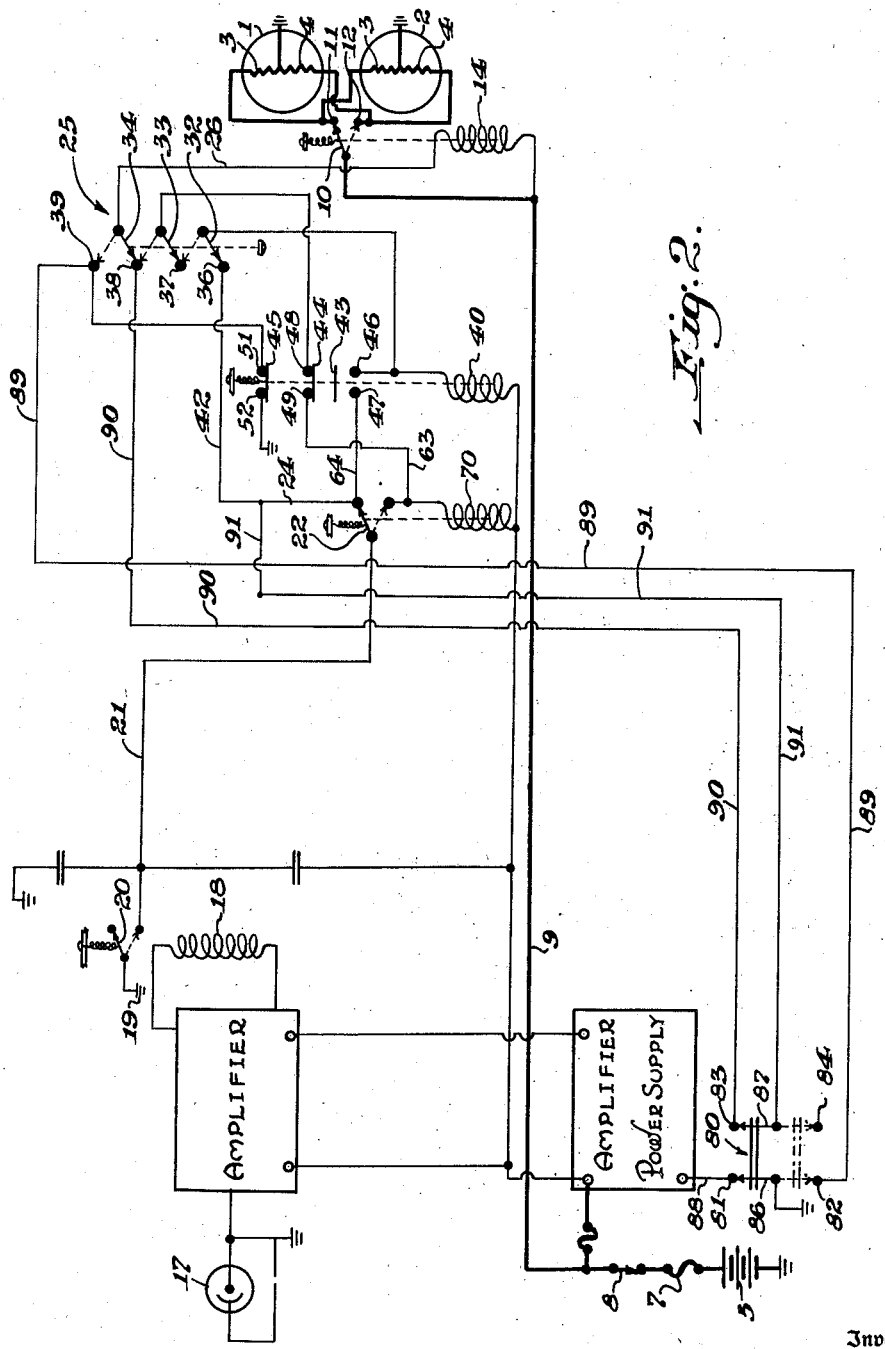

Patented Nov. 25, 1947

2,431,394

UNITED STATES PATENT OFFICE 2,431,394

AUTOMOBILE HEADLIGHT CONTROL

Alfred B. Friedman, Pittsburgh, Pa.

Application January 29, 1947, Serial No. 725,083

3 Claims. (Cl. 315—82)

This invention relates to automobile headlamps and, in particular, to electric control systems for automatically lowering the beam of such headlamps.

A number of systems have been devised to accomplish this purpose, some of which include a light sensitive cell which, when illuminated by light beams from approaching vehicles, initiates a current to move a switch, which movement causes energy from the automobile storage battery to be supplied to one or the other of the high and low beam filaments in the headlamps. However, for various reasons the known control systems have not been commercially successful. A particular disadvantage of the prior control systems is that adequate provision is not made for manually returning the lights to high beam when the light sensitive cell is illuminated from an external source. Although the need for such means should be limited to emergencies, when such an emergency does arise it is very important that such means be available for immediate and fast use.

It is therefore an object of this invention to provide an electric control system for lowering the beam of automobile headlamps which permits the beam to be raised when its light sensitive cell is illuminated.

Another object is to provide a similar system in which the direction of the headlamp beams is changed by an easily and quickly operated two position foot switch.

A further object is to provide a similar control system with an emergency switch operable to isolate automatic control and render the control of the lights manual only.

Other objects are to provide a control system in accordance with the above objects which is inexpensive, easily installed and durable in use.

The preferred embodiment of the invention is illustrated in the accompanying drawings in which Fig. 1 is a wiring diagram of the lighting and control system of the invention, and Fig. 2 is a wiring diagram of a system which includes an emergency switch.

Referring to Fig. 1, headlights 1 and 2 of an automobile are each provided, in the customary manner, with high and low beam filaments 3 and 4, respectively, the power for which is supplied by the usual grounded storage battery 5. The storage battery is alternately connected with the high and low beams by a circuit which includes a fuse 7, dashboard switch 8 and a wire 9 which terminates in a contact arm 10 movable between contacts 11 and 12 of the high and low beam filaments. An electromagnet 14 is arranged in this circuit so that when energized it attracts arm 10 to low beam filament contact point 12. When electromagnet 14 deenergizes, arm 10 is urged to its high beam filament contact point by a spring 16. To energize electromagnet 14, a light sensitive cell 17 of any suitable known type is mounted on the front of the automobile and current set up by light from approaching vehicles impinging thereon is amplified, controlled and electrically utilized to energize a second electromagnet 18 to close a switch arm 20 and cause a current to flow from ground 19 to electromagnet 14. This latter circuit includes a wire 21, a switch arm 22, switch contact point 23, wire 24, a foot switch 25 and wire 26 and it is completed to the ungrounded side of storage battery 5 through the headlight filament circuit.

Thus, when impinging light from approaching vehicles illuminates cell 17 electromagnet 14 normally is energized and the lights are depressed or dimmed. When such illumination ceases switch 20 is spring urged to its normally open position thereby permitting electromagnet 14 to deenergize to raise or brighten the lights. The means for amplifying the current induced by the light sensitive cell include standard pentode and triode tubes 27 and 28, the plate and grid-potential for which preferably is supplied by a dynamotor 29. The amplifier also includes resistors, potentiometers, capacitors and gas tube regulators all of which are electrically arranged in known manners to perform their usual functions in the amplifying circuit.

It is a feature of this invention that an electric control system is provided which, in addition to automatically depressing or dimming the headlights also provides full manual control regardless of the illumination of light sensitive cell 17. Generally, this is accomplished by the addition of a pair of magnetically actuated switches 30 and 31 electrically connected in the manner to be described to the above-mentioned foot switch 25. As shown in the drawings the foot switch has three arms 32, 33 and 34 which are mechanically connected so as to move simultaneously. Otherwise, it is a standard two-position type switch operable by a foot pedal 35 which conveniently extends through the floor board of the car near the driver. Four contacts 36, 37, 38 and 39 are provided for these arms and the normal position of the switch is that shown in full lines in the drawings. Magnetically actuated switch 30 of this pair includes an electromagnet 40 connected by wire 41 to arm 32 of the foot switch and this arm, in its normal position, is in engagement with foot switch contact 36. Contact 36, in turn, is connected by wire 42 to wire 24 of the circuit from ground 19 to electromagnet 14 so that when electromagnet 14 is energized, electromagnet 40 also is energized.

Electromagnet 40 actuates three switch arms 43, 44 and 45 which are also mechanically connected together. In their normal positions switch arm 43 is open and the other two arms closed.

When electromagnet 40 is energized, switch arm 43 closes its contacts 46 and 47, and the arms of the other two switches open their contacts 48, 49 and 51, 52. A spring 53 urges the switch arms to their normal position so that when electromagnet 40 deenergizes the switches return thereto.

The contacts of switch arms 43, 44 and 45 are electrically connected into the control system in the following described manner. Contact 51 of switch arm 45 is connected by a wire 60 to contact point 39 of the foot switch and its other contact 52 is grounded at point 61. Contact 48 of arm 44 is connected by a wire 62 to foot switch contact arm 33, and contact 49 by a wire 63 to an electromagnet 70 of magnetically actuated switch 31. The normally open contact 46 of arm 43 is connected into the circuit to electromagnet 40 and contact 47 is connected by a wire 64 to contact point 23 of the previously described light sensitive cell actuated circuit. Switch arm 22 of the last-mentioned circuit normally is spring-urged to contact point 23 and is movable to a point 71, the latter being connected to electromagnet 70 so that, when electromagnet 70 is energized, the arm is attracted to point 71 and when not energized the arm is spring returned to point 23. Switch arm 22 and its contact points should be so arranged that the arm maintains contact with point 23 until after it has contacted point 71. Otherwise all circuits would be opened momentarily. Such switch construction is commonly known and need not be described.

The functions of the above-described electrical arrangements can best be understood by assuming the various conditions under which the control system will be required to operate and by describing its operations under these conditions. The primary purpose of a control system of this type is to automatically dim the lights when another car is approaching. This has been previously described and occurs when switch arm 22 and foot switch arm 34 are in their full line or normal automatic positions, and when the current induced by the light sensitive cell energizes and closes switch arm 20. Electric energy then is supplied to electromagnet 14 to draw arm 10 to low beam circuit closing position and the lights are automatically dimmed. When illumination of the cell ceases, switch arm 20 springs open permitting electromagnet 14 to deenergize and its arm 10 to return to high beam circuit closing position.

In addition, under normal conditions the energy initiated by illumination of the cell also flows through wire 42, foot switch contact arm 32, and wire 41 to energize electromagnet 40, thereby closing switch arm 43 and opening arms 44 and 45. The opening of arm 45 opens its circuit from ground 61 to foot switch contact 39. Consequently, if it is desired to raise or brighten the headlights while the light sensitive cell is illuminated, the foot switch pedal can be pressed to move arm 34 to ungrounded contact 39. Electromagnet 14 then deenergizes and switch arm 10 springs back to the high beam circuit closing position. Electromagnet 40 remains energized since it is grounded at ground 19.

When the lights have been so raised by moving arm 34 to contact point 39 while the cell was illuminated, and such illumination ceases, switch 20 springs open thereby permitting electromagnet 40 to deenergize and switch 45 to close. Closing of switch 45 then closes the connection of electromagnet 14 to ground 61 thus moving arm 10 to low beam circuit closing position and automatically dimming the lights. This is particularly advantageous since it is a warning to the driver that his foot switch is in non-automatic or dotted line position and he may then return it to automatic or full line position so as to be prepared for the next passing vehicle.

Another situation arises when the lights have been manually dimmed in the absence of illumination of the cell by pressing the foot switch to move its arms to their dotted line positions and, in particular, arm 34 to grounded contact point 39. Now, if the cell is illuminated, energy will flow in the usual manner through wire 24, but, instead of proceeding to electromagnet 14, it will be led through arm 33 of the foot switch, wire 62, switch arm 44 and wire 63 to electromagnet 70 to energize it. Electromagnet 40 will not be energized since its foot switch arm 32 is open circuited. The energization of electromagnet 70 draws switch arm 22 away from contact point 23 to contact point 71. Switch arm 45, in this instance, will not be opened and, therefore, dim lights will be maintained. However, if it is desired to raise the lights in the presence of this illumination, it can be accomplished by pressing the foot switch to return it to its normal full line position. Electromagnet 70 will not deenergize since it is grounded through closed light cell switch arm 20 at point 19. Thus, arm 22 remains at contact point 71 and energy can not flow through wire 24 to energize electromagnet 14. The result is that the light beam will be raised or brightened.

With the various switch arms in their last described positions, i. e., having been manually raised by moving the foot switch arms to their full line positions, when illumination of the cell ceases, electromagnet 70 deenergizes since its circuit to ground opens. Consequently, switch arm 22 returns to its normal contact point 23. Without cell illumination, no energy flows to electromagnet 14 and the lights remain bright.

Thus, it will be seen that whether the foot switch is operated in the presence or absence of external illumination, such movement produces the opposite condition of the headlights than that which obtained prior to such movement. Thus, an electrical control system is provided which has full manual control. Further, on approach of another vehicle, the lights will either be dim, or if bright, will be dimmed automatically by the lights of the other vehicle. In the one instance, i. e., when the lights have been raised by moving foot switch arm 34 to its dotted line position while light sensitive cell 17 is illuminated, the lights will automatically lower after the illumination ceases and the driver will be warned to return the foot switch to normal full line or automatic position.

Another feature of this invention is that an emergency switch is provided which can be operated to isolate the influence of the light sensitive cell and to restore manual control regardless of any failure in the amplifier, its power supply, or the various relays and their wiring. Referring to Fig. 2, such a switch 80 is a di-pole manual switch and includes two pairs of contacts 81, 82 and 83, 84, and a pair of switch arms 86 and 87. Contact 81 of the first pair is connected by wire 88 to the low side of the amplifier power supply, or dynamotor, and the other contact 82 is connected by wire 89 to foot switch contact point 39. Switch arm 86 of this pair is permanently grounded. When switch arm 86 is in its normal full line position it provides a ground for the dynamotor and when it is moved to its dotted line position it provides a permanently grounded position for foot switch arm 34 so that the lights of the automobile can be manually dimmed at any time by moving switch arm 34 to contact point 39.

Contact point 84 of the other pair is ungrounded and contact point 83 is connected by a wire 99 to foot switch contact 38. Switch arm 87 is connected by a wire 91 to wire 24 of the light sensitive circuit from ground 19 to electromagnet 14. Thus, in the normal full line position of switch arm 87, the current initiated by the closing of switch arm 20 flows through wire 21, arm 22, wires 24 and 91, switch arm 87, wire 90, arm 34 and wire 26 to energize electromagnet 14. However, when it is desired to isolate the light sensitive circuit just described it is only necessary to move switch arm 87 to its ungrounded contact point 84. The movement of the emergency switch arms to their dotted line positions thus isolates the light sensitive circuit and provides two positions in the foot switch, i. e., points 38 and 39, to which switch arm 34 can be moved and at which the lights will remain bright or dim regardless of the illumination of the light sensitive cell and regardless of any failure in any of the elements of the light sensitive circuit.

According to the provisions of the patent statutes, I have explained the principle, construction and mode of operation of the invention and have illustrated and described what now is considered to be its best embodiment. However, it is to be understood that, within the scope of the appended claims, the invention may be practiced by other forms than those specifically illustrated and described.

I claim:

1. An electric control system for vehicle headlight lamps equipped with high and low beam filaments, comprising a source of electrical energy, electrical circuits connecting both of said filaments with said source, a movable contact arm in said circuits, said arm being yieldably urged into high beam circuit closing position, an electromagnet electrically connected with said source and operable when energized to move said arm to low beam circuit closing position, a light sensitive cell, an electrical circuit between said cell and said electromagnet to energize the latter when said cell is illuminated, a manually operable two-position foot-switch arranged electrically in the circuit between said cell and electromagnet and providing manual headlight control, and a pair of magnetically actuated switches responsive to said manual switch and separately energized by the illumination of the light sensitive cell, one of said pair operating when energized to permit said movable contact arm to move from the low to the high beam filament when said light beams have been automatically lowered and the other operating when energized to permit said contact arm to move to the high beam filament when the low beam circuit has been manually closed in the absence of illumination of said light sensitive cell whereby a headlamp control system having automatic and full manual control is provided.

2. An electric control system for vehicle headlight lamps equipped with high and low beam filaments, comprising a source of electrical energy, electrical circuits connecting both of said filaments with said source, a movable contact arm in said circuits, said arm being yieldably urged into high beam circuit closing position, an electromagnet electrically connected with said source and operable when energized to move said arm to low beam circuit closing position, a light sensitive cell, an electrical circuit between said cell and said electromagnet to energize the latter when said cell is illuminated, a manually operable two-position foot-switch arranged electrically in the circuit between said cell and electromagnet and providing manual headlight control, a pair of magnetically actuated switches responsive to said manual switch and separately energized by the illumination of the light sensitive cell, one of said pairs operating when energized to permit said movable contact arm to move from the low to the high beam filament when said light beams have been automatically lowered and the other operating when energized to permit said contact arm to move to the high beam filament when the low beam circuit has been manually closed in the absence of illumination of said light sensitive cell whereby a headlamp control system having automatic and full manual control is provided, and the former of said pair also automatically closing the low beam circuit when said high beam circuit has been manually closed in the presence of illumination and said illumination ceases.

3. An electric control system for vehicle headlight lamps equipped with high and low beam filaments, comprising a source of electrical energy, electrical circuits connecting both of said filaments with said source, a movable contact arm in said circuits, said arm being yieldably urged into high beam circuit closing position, an electromagnet electrically connected with said source and operable when energized to move said arm to low beam circuit closing position, a light sensitive cell, an electrical circuit between said cell and said electromagnet to energize the latter when said cell is illuminated, a manually operable switch arranged electrically in the circuit between said cell and electromagnet and providing manual headlight control, a pair of magnetically actuated switches responsive to said manual switch and separately energized by the illumination of the light sensitive cell, one of said pair operating when energized to permit said movable contact arm to move from the low to the high filament when said lights have been automatically lowered and the other operating when energized to permit said contact arm to move to the high filament when the low beam circuit has been manually closed in the absence of illumination of said light sensitive cell whereby a headlamp control system having automatic and full manual control is provided, and an emergency switch movable to provide positions in said manually operable switch at which the low and high beam circuits can be closed and will remain closed regardless of the illumination of said light sensitive cell.

ALFRED B. FRIEDMAN.

REFERENCES CITED

The following references are of record in the file of this patent:

UNITED STATES PATENTS

| Number | Name | Date |
|---|---|---|
| 2,392,446 | Annis | Jan. 8, 1946 |